(12) United States Patent
Suzuki et al.

(10) Patent No.: US 8,976,640 B2
(45) Date of Patent: Mar. 10, 2015

(54) INFORMATION RECORDING MEDIUM AND DISC

(71) Applicant: Sony Corporation, Tokyo (JP)

(72) Inventors: Yuuichi Suzuki, Kanagawa (JP); Kensaku Takahashi, Kanagawa (JP); Nobuhiko Ando, Tokyo (JP); Tetsuya Inoue, Kanagawa (JP); Yutaka Tentaku, Kanagawa (JP); Hiroaki Nakagawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/155,523

(22) Filed: Jan. 15, 2014

(65) Prior Publication Data

US 2014/0204725 A1    Jul. 24, 2014

(30) Foreign Application Priority Data

Jan. 22, 2013    (JP) ................... 2013-009294

(51) Int. Cl.
*G11B 7/24*    (2013.01)
*G11B 7/007*    (2006.01)

(52) U.S. Cl.
CPC ..................... *G11B 7/007* (2013.01)
USPC ..................... 369/275.3; 369/275.4

(58) Field of Classification Search
USPC ............ 369/275.1–275.4, 44.26, 59.1, 59.11, 369/59.12, 59.19, 47.28, 280
See application file for complete search history.

(56) References Cited

U.S. PATENT DOCUMENTS

| | | | | |
|---|---|---|---|---|
| 6,671,238 B1 * | 12/2003 | Ko et al. | ...... | 369/47.1 |
| 6,744,718 B1 * | 6/2004 | Ko et al. | ...... | 369/59.25 |
| 6,813,230 B1 * | 11/2004 | Ko et al. | ...... | 369/47.1 |
| 7,092,329 B2 * | 8/2006 | Ko et al. | ...... | 369/47.27 |
| 7,656,780 B2 * | 2/2010 | Heemskerk et al. | ...... | 369/275.4 |

FOREIGN PATENT DOCUMENTS

JP    2003-123265 A    4/2003

* cited by examiner

*Primary Examiner* — Ali Neyzari
(74) *Attorney, Agent, or Firm* — Wolf, Greenfield & Sacks, P.C.

(57) ABSTRACT

An information recording medium includes a plurality of wobbled tracks, in which a phase mismatch range of an adjacent wobble is a portion of a range of one track.

11 Claims, 15 Drawing Sheets

FIG. 2

FIG. 3
| TRK NUMBER | WOBBLE NUMBER IN TRK | ANGLE REGION NUMBER | | | | | | | | | |
|---|---|---|---|---|---|---|---|---|---|---|---|
| | | 1 | 2 | 3 | 4 | 5 | 6 | 7 | 8 | 9 | 10 |
| 1 | 38000 | | | | | | | | | | |
| 2 | 38001 | | | | | | | | | | |
| 3 | 38002 | | | | | | | | | | |
| 4 | 38003 | | | | | | | | | | |
| 5 | 38003 | | | | | | | | | | |
| 6 | 38004 | | | | | | | | | | |
| 7 | 38004 | | | | | | | | | | |
| 8 | 38005 | | | | | | | | | | |
| 9 | 38005 | | | | | | | | | | |
| 10 | 38006 | | | | | | | | | | |
| 11 | 38006 | | | | | | | | | | |
| 12 | 38007 | | | | | | | | | | |
| 13 | 38008 | | | | | | | | | | |
| 14 | 38008 | | | | | | | | | | |
| 15 | 38009 | | | | | | | | | | |
| 16 | 38009 | | | | | | | | | | |
| 17 | 38010 | | | | | | | | | | |
| 18 | 38010 | | | | | | | | | | |
| 19 | 38011 | | | | | | | | | | |
| 20 | 38011 | | | | | | | | | | |
☐ REGION OF WOBBLE NUMBER AS STANDARD (WOBBLE NUMBER: 3800)
 REGION WHERE WOBBLE NUMBER IS INCREASED BY ONE LAYER TO STANDARD WOBBLE NUMBER (WOBBLE NUMBER: 3801)
 REGION WHERE WOBBLE NUMBER IS INCREASED BY TWO LAYERS TO STANDARD WOBBLE NUMBER (WOBBLE NUMBER: 3802)
▬ RANGE WHERE ADJACENT WOBBLE PHASE DOES NOT MATCH
←→ RUB FIG. 6
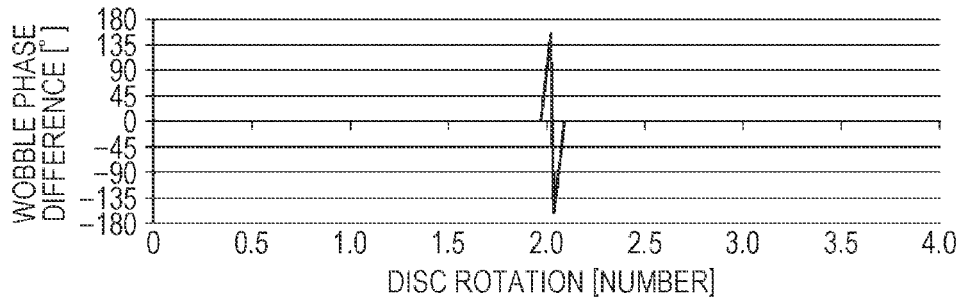
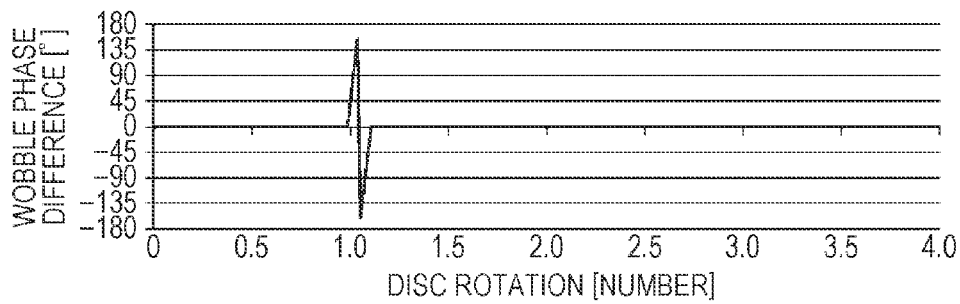
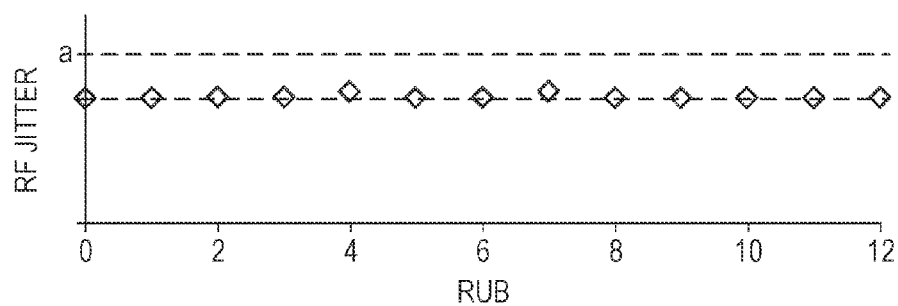

G: GROOVE
L: LAND

G: GROOVE
L: LAND

FIG. 11

| TRK NUMBER | WOBBLE NUMBER IN TRK | ANGLE REGION NUMBER | | | | | | | | | |
|---|---|---|---|---|---|---|---|---|---|---|---|
| | | 1 | 2 | 3 | 4 | 5 | 6 | 7 | 8 | 9 | 10 |
| 1 | 38000 | | | | | | | | | | |
| 2 | 38001 | | | | | | | | | | |
| 3 | 38002 | | | | | | | | | | |
| 4 | 38003 | | | | | | | | | | |
| 5 | 38003 | | | | | | | | | | |
| 6 | 38004 | | | | | | | | | | |
| 7 | 38004 | | | | | | | | | | |
| 8 | 38005 | | | | | | | | | | |
| 9 | 38005 | | | | | | | | | | |
| 10 | 38006 | | | | | | | | | | |
| 11 | 38006 | | | | | | | | | | |
| 12 | 38007 | | | | | | | | | | |
| 13 | 38008 | | | | | | | | | | |
| 14 | 38008 | | | | | | | | | | |
| 15 | 38009 | | | | | | | | | | |
| 16 | 38009 | | | | | | | | | | |
| 17 | 38010 | | | | | | | | | | |
| 18 | 38010 | | | | | | | | | | |
| 19 | 38011 | | | | | | | | | | |
| 20 | 38011 | | | | | | | | | | |

- REGION OF WOBBLE NUMBER AS STANDARD (WOBBLE NUMBER: 3800)
- REGION WHERE WOBBLE NUMBER IS INCREASED BY ONE LAYER TO STANDARD WOBBLE NUMBER (WOBBLE NUMBER: 3801)
- REGION WHERE WOBBLE NUMBER IS INCREASED BY TWO LAYERS TO STANDARD WOBBLE NUMBER (WOBBLE NUMBER: 3802)
- REGION INCREASED BY 0.5 WOBBLE LAYER TO TWO TRACKS
- FIRST PHASE MISMATCH RANGE: PHASE MISMATCH BY WOBBLE INCREASE TO STANDARD WOBBLE NUMBER
- CONSTANT PHASE DIFFERENCE RANGE: RANGE WHERE PHASE DIFFERENCE BETWEEN ADJACENT WOBBLES IS +90° OR −90°
- SECOND PHASE MISMATCH RANGE: PHASE MISMATCH BY 0.5 WOBBLE INCREASE
- THIRD PHASE MISMATCH RANGE: RANGE WHERE FIRST AND SECOND PHASE MISMATCH RANGES ARE OVERLAPPED
- →←  RUB

FIG. 12
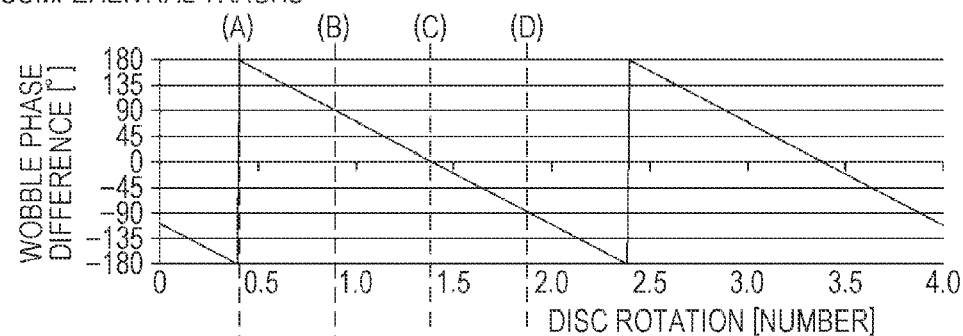
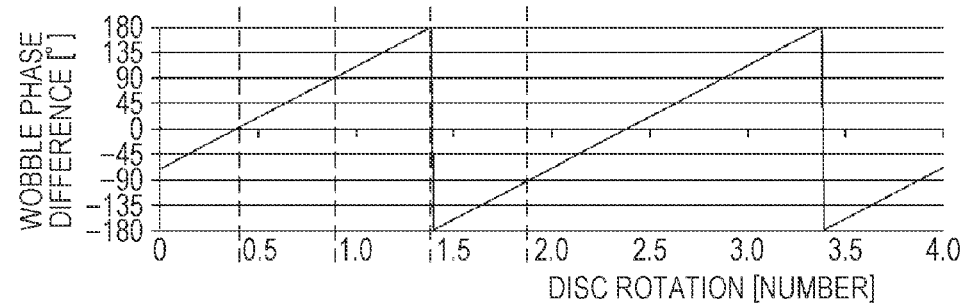

RECORDING AND REPRODUCTION
CHARACTERISTIC: BAD

RECORDING AND REPRODUCTION
CHARACTERISTIC: GOOD

RECORDING AND REPRODUCTION
CHARACTERISTIC: BAD

RECORDING AND REPRODUCTION
CHARACTERISTIC: GOOD

FIG. 14
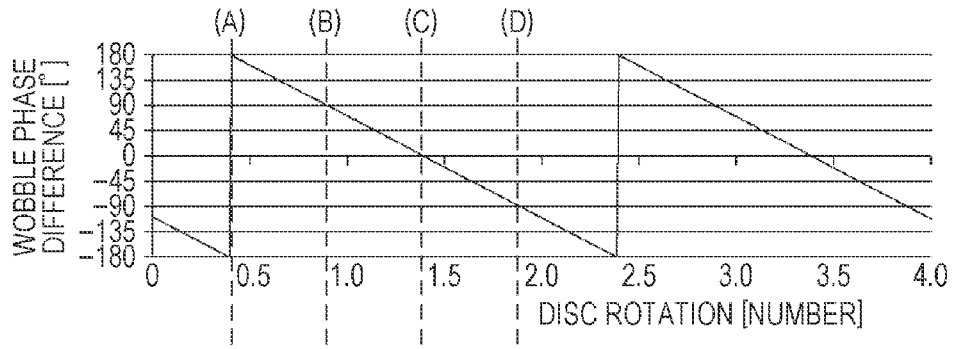
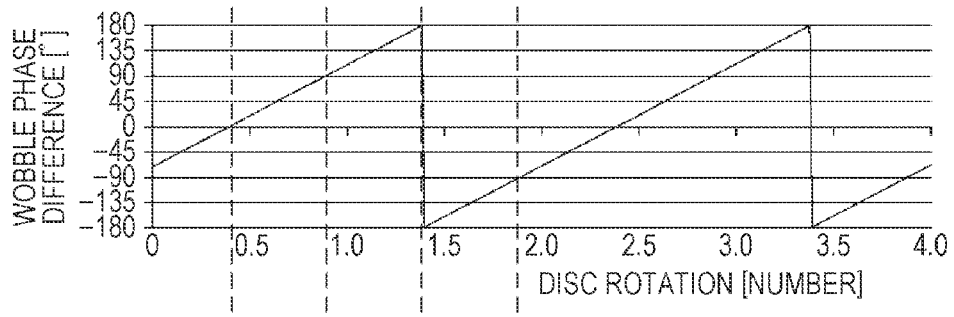
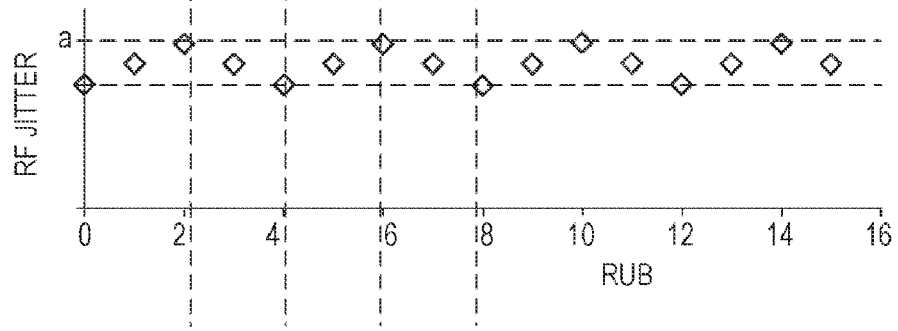

INFORMATION RECORDING MEDIUM AND DISC

CROSS REFERENCE TO RELATED APPLICATIONS

This application claims the benefit of Japanese Priority Patent Application JP 2013-009294 filed Jan. 22, 2013, the entire contents of which are incorporated herein by reference.

BACKGROUND

The present technology relates to an information recording medium and a disc. Specifically, the present technology relates to the information recording medium which has a plurality of wobbled tracks and the disc for manufacturing the same.

There are many optical discs which adopt a wobble method in a CLV (Constant Linear Velocity) type optical disc format such as a write-once type and a rewritable type (R/RE) of a BD (Blu-ray Disc (registered trademark)), or a portion of a recordable DVD (Digital Versatile Disc), in order to create block and address. A wobble phase difference between adjacent tracks continuously changes in the optical disc of a CLV format compliance of the related art. If the wobble phase difference between the adjacent tracks meets certain conditions, it is possible to know a cause of deterioration of recording and reproduction characteristics or address reproduction characteristics.

FIG. 12 is a view showing the wobble phase difference between the adjacent tracks in BD. Since a main disc is made with very high accuracy, as substantially calculated from a BD standard, the wobble phase difference between the adjacent tracks changes from −180° to +180°, in approximately two rotation cycles.

In a case where the wobble phase of the adjacent track has a different phase, a groove center-to-center distance between the adjacent tracks periodically changes, and an unnecessary signal which has the same cycle as the wobble signal appears to a push-pull signal by optical interference. This is referred to as a wobble beat and becomes a cause of deteriorating an address reproduction performance. In addition, on the condition that the phases of an inner circumference track and an outer circumference track are close to the opposite phases, the unnecessary signal of the wobble signal cycle is also leaked to an RF (Radio Frequency) signal and becomes a cause of deteriorating a jitter of the RF signal. As for the recording, local heat transfer at the time of recording is changed by changing intervals (land width) between the adjacent tracks and becomes a cause which local deviation occurs in optimum recording conditions.

FIGS. 13A to 13D are schematic views showing four patterns which are extracted from periodical adjacent wobble phase changes. A groove format in which the recording and the reproduction of an information signal is performed on the groove is adopted in the BD. The wobble phases of three groove tracks $T_{n-1}$, $T_n$, and $T_{n+1}$, are shown in FIGS. 13A to 13D. Moreover, the wobble phases of FIGS. 13A to 13D respectively correspond to the positions shown in reference signs (A) to (D) in FIG. 12. Spots of laser beams are condensed on the track $T_n$ in the center, and the track $T_n$ is traced. In cases of FIG. 13A and FIG. 13C, either a track of the inner circumference or a track of the outer circumference and the wobble phase match with each other, but the wobble phase is inverted against the other track. In this state where phase relations of both sides are inverted against each other, an unnecessary signal component is leaked into the reproduction RF signal and becomes the worst-case conditions as reproduction characteristics. Also as for recording, a land width change between the adjacent tracks is largest and becomes a bad condition. In cases of FIGS. 13B and 13D, the phase between the adjacent tracks is shifted by the size of 90 degrees and the phases of the tracks on both sides are aligned. Under these conditions, a wobble beat component leakage into the reproduction RF signal is at a minimum and is best as an RF reproduction characteristic. Also a land width variation related to the recording is small as compared with the cases of FIGS. 13A and 13C.

FIG. 14 is a view schematically showing a relation between the wobble phase of the adjacent track and an RF jitter of an RUB (Recording Unit Block) unit. In a case where either wobble of the inner circumference or wobble of the outer circumference has the same phase and another wobble phase, it is possible to know that the deterioration of the RF jitter is most remarkable.

As shown in FIG. 15, it is desirable that the wobbles of the tracks adjacent to both sides of the inner circumferential side and the outer circumferential side have the same phases. Hereinafter, the wobble of the adjacent track is appropriately referred to as the "adjacent wobble." In a state of the same phase, the wobble beat component does not occur. In addition, even if a wobble amplitude is increased in order to further improve the address reproduction performance, the recording and the reproduction characteristics are not affected. However, as shown in FIG. 15, it is not possible to match both adjacent wobbles of the inner circumferential side and the outer circumferential side with the phase in the existing CLV format compliance optical disc. For this reason, the phases between the adjacent wobbles are not matched, and the characteristics of an optical disc are decreased.

An optical disc in which a zone is divided in a radius direction and a frequency and the phase relation of the adjacent wobble are the same in one zone is suggested in order to stabilize a clock signal used for recording and reproduction of data in Japanese Unexamined Patent Application Publication No. 2003-123265.

SUMMARY

It is desirable to provide an information recording medium in which a decrease in characteristics of an optical disc, which is caused by a phase mismatch of an adjacent wobble, can be suppressed and a disc for manufacturing the same.

According to an embodiment of the present technology, there is provided an information recording medium including a plurality of wobbled tracks, in which the phase mismatch range of an adjacent wobble is a portion of a range of one track.

According to another embodiment of the present technology, there is provided a disc including a plurality of wobbled tracks, in which the phase mismatch range of the adjacent wobble is a portion of a range of one track.

According to still another embodiment of the present embodiment, there is provided an information recording medium including a plurality of wobbled tracks, in which a phase difference between the adjacent wobbles on both sides is +90° or −90° except for a portion of the range of one track.

According to still another embodiment of the present technology, there is provided a disc including a plurality of wobbled tracks, in which the phase difference between the adjacent wobbles on both sides is +90° or −90° except for a portion of the range of one track.

As described above, according to the embodiment of the present technology, it is possible to suppress a decrease in characteristics of an optical disc caused by a phase mismatch of an adjacent wobble.

BRIEF DESCRIPTION OF THE DRAWINGS

FIG. 2 is a diagram for describing a format of a radius partition.

FIG. 3 is a diagram for describing the format of an angle region.

FIG. 6 is a view showing an adjacent wobble phase change and an RF jitter change.

FIG. 11 is a diagram for describing the format of the optical disc to which a disc angle division type and the 90° phase type are combined and applied.

FIG. 12 is a view showing the phase difference of the adjacent wobble in BD.

FIG. 14 is a view schematically showing a relation between the phase of the adjacent wobble and the RF jitter of an RUB unit.

DETAILED DESCRIPTION OF EMBODIMENTS

Description will be given with regard to embodiments of the present technology with reference to drawings.

1. First embodiment (example of optical disc to which disc angle region division type is adopted)

1-1. Overview
1-2. Configuration of Optical Disc
1-3. Format of Optical Disc
1-4. Configuration of Disc
1-5. Format of Disc
1-6. Effect
2. Second Embodiment (example of optical disc to which 90° phase type is adopted)
2-1. Overview
2-2. Format of optical disc
2-3. Effect
3. Modification Example
1. First Embodiment
1-1. Overview A first embodiment is an optical disc in which a phase of an adjacent wobble is set to the same phase in a most region by making a device of wobble arrangement and changing a wobble length to be within a permissible error range of an existing CLV type optical disc format.

Taking a BDXL format as an example, in a case where a wobble length is a standard value, approximately 37,500 wobbles per one track are present in an innermost circumference of a user area. In terms of a wobble length, an error of approximately 0.12% is recognized. In other words, even if there is a difference in an average wobble length corresponding to approximately ±46 wobbles per one track, the wobble length is within the permissible error range. A state where the adjacent wobble phase has the same phase is created in a most recording region of the disc by performing a small change of the wobble length, which can be sufficiently within the permissible error range in the first embodiment.

As long as the type is the CLV type, it is necessary that the number of wobbles present in one track gradually increases toward an outer circumference. In a boundary portion where the number of wobbles present in one track is different from the number of wobbles present in the adjacent tracks, it is not possible to set the wobble phase between the adjacent tracks to the completely same phase. How to arrange a out-of-phase portion is one of the characteristics of the first embodiment.

1-2. Configuration of Optical Disc

Figure 1A:
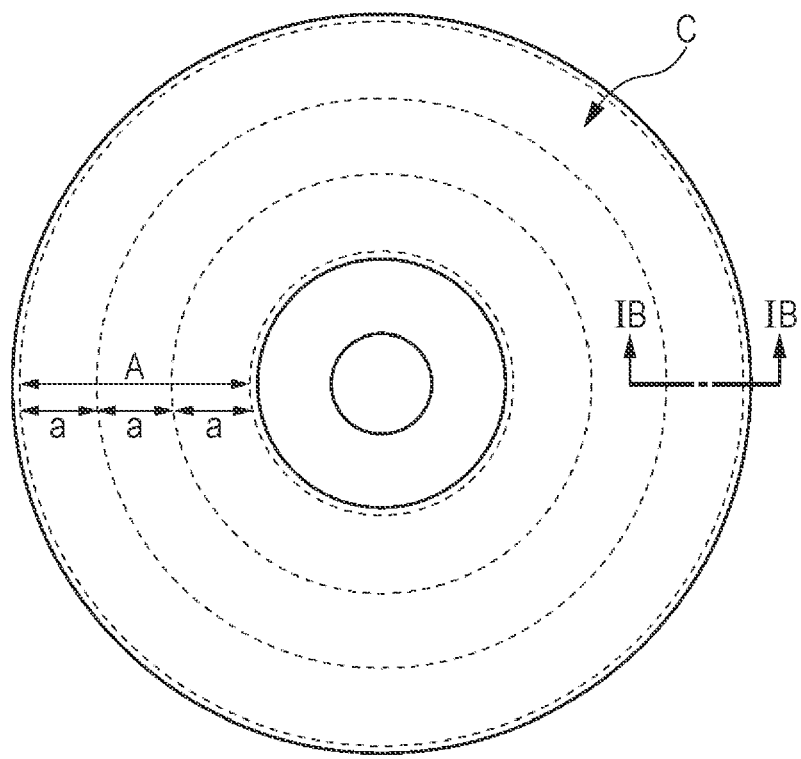
FIG. 1A is a plan view showing one example of an appearance of an optical disc according to a first embodiment of the present technology.

FIG. 1A is a plan view showing one example of an appearance of an optical disc according to a first embodiment of the present technology. An optical disc 10 is, so-called, a write-once type or a rewritable type optical disc (optical information recording medium), as shown in FIG. 1A, and has a discoid shape provided with an opening (hereinafter, referred to as "center hole") in the center.

Figure 1B:
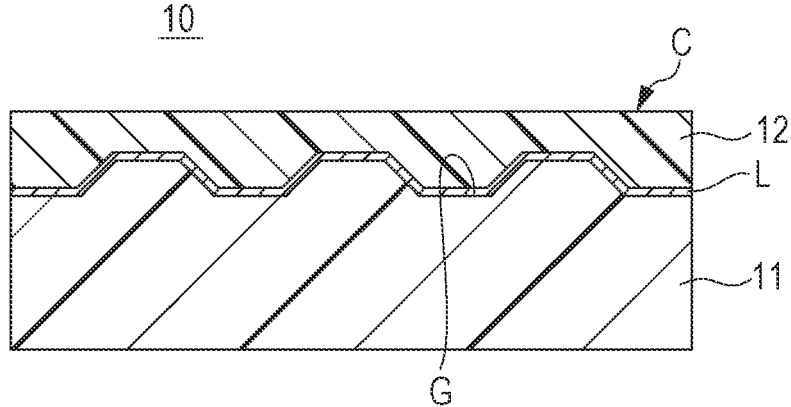
FIG. 1B is a cross-sectional view showing a portion of a cross section taken along a IB-IB line of FIG. 1A.

FIG. 1B is a sectional view showing a portion of a cross section taken along a IB-IB line in FIG. 1A. The optical disc 10, as shown in FIG. 1B, has a configuration in which an information signal layer L and a light transmission layer 12, which is a cover layer, are stacked on one main surface of a substrate 11 in this order.

In the optical disc 10 according to the first embodiment, the recording or the reproduction of the information signal is performed by irradiating the information signal layer L with a laser beam from a surface C of a light transmission layer 12 side. For example, the recording or the reproduction of the information signal is performed by condensing the laser beam having a wavelength in the range of 400 nm to 410 nm through an objective lens having a numerical aperture in the range of 0.84 to 0.86 and then irradiating the information signal layer L with the laser beam from the side of the surface C of the light transmission layer 12. As the optical disc 10, for example, a single-layered BD-R (Blu-ray Disc Recordable (registered trademark)) or a BD-RE (Blu-ray Disc Rewritable (registered trademark)) can be taken as an example.

Hereinafter, description will be given with regard to the substrate 11, the information signal layer L, and the light transmission layer 12, which configure the optical disc 10, in order.

Substrate

The substrate 11 has a discoid shape, which is provided with a center hole in the center. One main surface of the substrate 11 becomes a concave-convex surface, and the information signal layer L is formed on the concave-convex surface. The concave-convex surface is configured of a groove G and a land L. The groove G and the land L are the portions respectively obtained by transferring the groove and the land of the disc, which will be described later. Moreover, in the present specification, the portion which is exposed by the laser beam at the time of manufacturing a disc is referred to as the groove G, and the portion which is interposed between adjacent grooves is referred to as the land L. In FIG. 1B, an example in which the concave portion is set to the groove G, and the convex portion is set to the land L is shown of the convex-concave surface.

As the shapes of the groove G and the land L, for example, various shapes such as a spiral shape and a concentric shape and the like can be taken as examples. In addition, the groove G and/or the land L are, for example, wobbled (meandered) for stabilization of linear velocity or address information addition or the like. One of the groove G or the land L is used as a track for recording the information signal. Hereinafter, description will be given with regard to the track of the groove G.

A diameter of the substrate 11 is, for example, selected as 120 mm. A thickness of the substrate 11 is selected preferably from the range of 0.3 mm to 1.3 mm, or more preferably, 0.6 mm to 1.3 mm, and for example, is selected as 1.1 mm in consideration of rigidity. In addition, the diameter of the center hole is, for example, selected as 15 mm.

As a material of the substrate 11, for example, it is possible to use a plastic material or glass, but it is preferable to use the plastic material from a cost perspective. As the plastic material, for example, it is possible to use a polycarbonate resin, a polyolefin resin, and an acrylic resin, and the like.

The information signal layer L includes at least a recording layer in which the information signal can be recorded by the irradiation of the laser beam. As the recording layer, for example, it is possible to use the recording layer in which the information signal can be written only once or the recording layer in which the information signal is rewritable.

Light Transmission Layer

The light transmission layer 12 is, for example, a resin layer formed by curing a photosensitive resin such as an ultraviolet curing resin and the like. As a material of the resin layer, for example, the ultraviolet curing-type acrylic resin can be used. In addition, the light transmission layer 12 may be configured of a light transmission sheet having an annular shape and an adhesive layer for bonding the light transmission sheet onto the substrate 11.

The thickness of the light transmission layer 12 is selected from the range of 10 μm to 177 μm, and for example, is selected as 100 μm. It is possible to realize the high-density recording by combining such a thin light transmission layer 12 and, for example, an objective lens made higher in a numerical aperture (NA) of approximately 0.85 degree.

1-3. Format of Optical Disc

Recording Region

As shown in FIG. 1A, the optical disc 10 has a recording region A, and a plurality of partitions (hereinafter, referred to as "radius partition") a are provided in the recording region A in order in an outer circumferential direction (that is, radius direction) from the inner circumference thereof. Each radius partition a has an annular shape. Moreover, in FIG. 1A, an example of "three" is shown as the number of divisions of the radius partition a, but the number of divisions is not limited to the example.

Radius Partition

Figure 2:
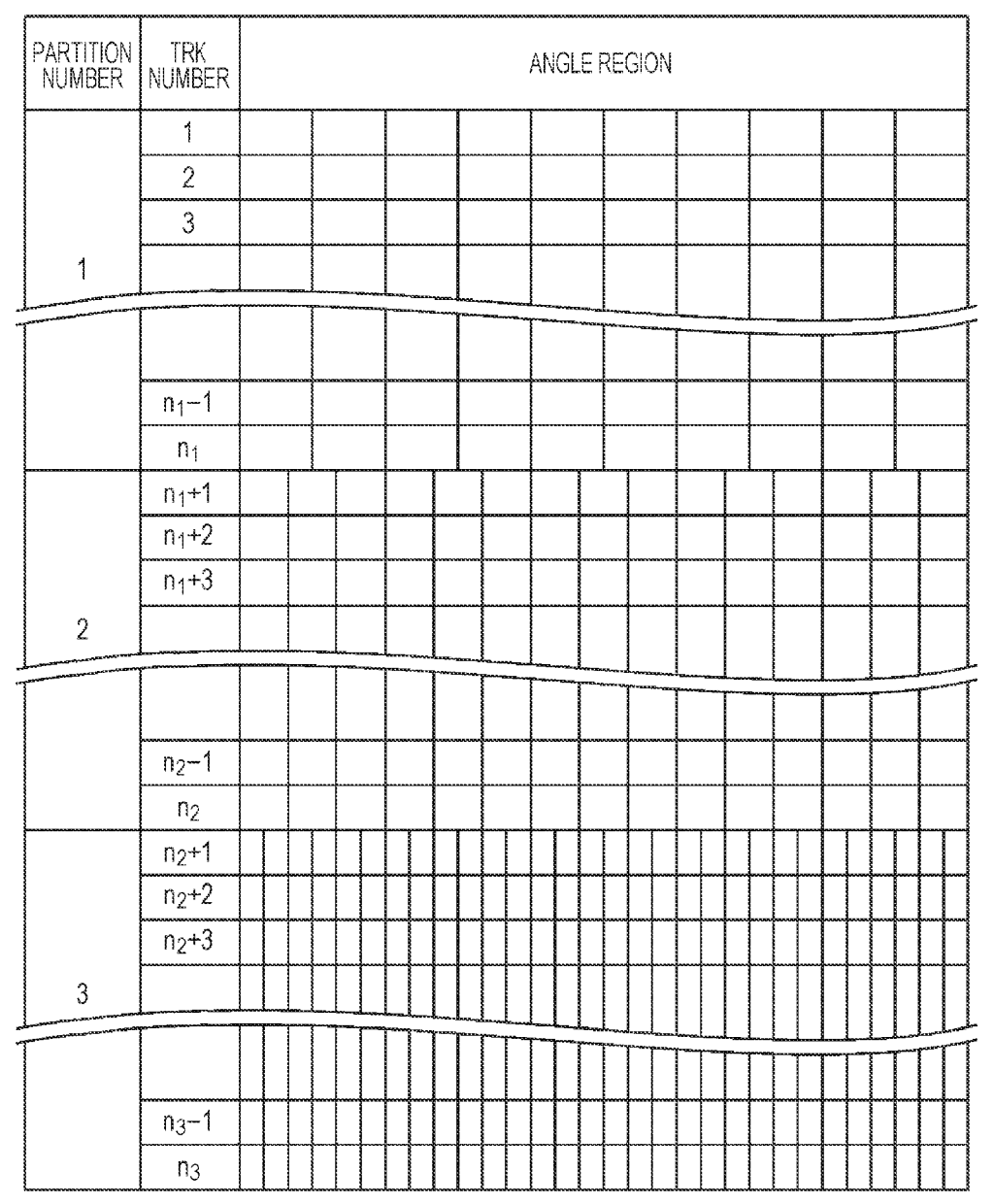

FIG. 2 is a diagram for describing a format of a radius partition. Moreover, in FIG. 2, each radius partition a is shown as being converted to a rectangular shape for ease of illustration. In addition, also in FIG. 2, the example of "three" is shown as the number of divisions, but as described above in detail, the number of divisions is not limited to the example.

Each radius partition a has a plurality of divided regions (hereinafter, referred to as "angle region"), which is radially divided from the center of the optical disc 10. The number of the divisions of the angle region is different for each radius partition, and the number of the divisions is as great as the angle region of the outer circumferential side. For example, in a case where a recording region A of the optical disc 10 is divided into three portions of a first to a third radius partitions a, the number of the division of the first to the third radius partitions a are respectively selected as "10", "15", and "30".

Angle Region

FIG. 3 is a diagram for describing the format of the angle region. In FIG. 3, an example in which the recording region A of the optical disc 10 is radially divided into ten portions from the center is shown. Here, it is a condition that 38,000 wobbles are present in the first track and approximately 2.5 RUB are present per one track for ease of description. The RUB is a unit recording main data (recording reproduction data) and is a predetermined length, for example, 64K bytes. In addition, the RUB is a unit of an error correction block.

A phase mismatch range where there is a deviation in the phase of the adjacent wobble, and a phase matching range where the phase of the adjacent wobble matches are in the recording region A of the optical disc 10. The phase mismatch range is a portion of the range of one track, and the phase matching range is a remaining range of one track. The phase mismatch range is, for example, provided in units of a divided region.

Figure 4A:
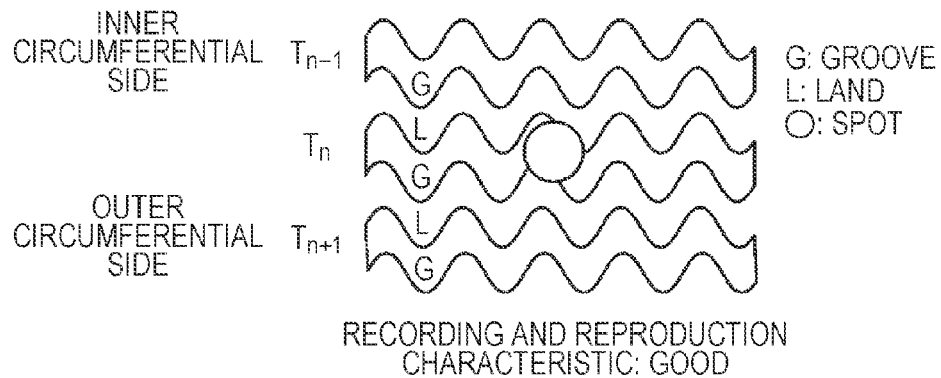
FIG. 4A is a schematic view showing a region where both adjacent wobbles of an inner circumferential side and an outer circumferential side have the same phases.

FIG. 4A is a schematic view showing a region where both adjacent wobbles of an inner circumferential side and an outer circumferential side are in the same phase. For example, as shown in FIG. 4A, both adjacent wobbles of the inner circumferential side and the outer circumferential side are in a state of having the same phases in the angle regions shown in angle region numbers "2 to 4" and "6 to 10" of a track (TRK) number "2".

Figure 4B:
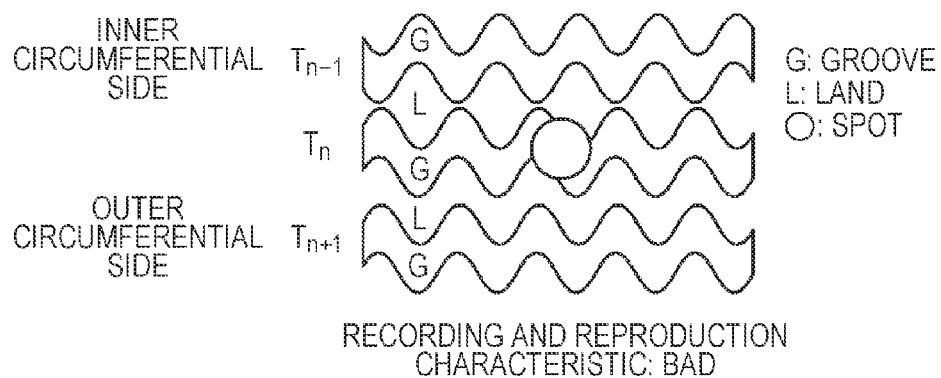
FIG. 4B is a schematic view showing a region where the adjacent wobble of an outer circumferential side has the same phase whereas the adjacent wobble of an inner circumferential side has a different phase.

FIG. 4B is a schematic view showing a region where the adjacent wobble of an outer circumferential side has the same phase whereas the adjacent wobble of an inner circumferential side has a different phase. For example, as shown in FIG. 4B, the adjacent wobble of the outer circumferential side is in the state of having the same phase in the angle region shown in an angle region number "1" of a track (TRK) number "2", whereas the adjacent wobble of the inner circumferential side has a different phase.

Figure 4C:
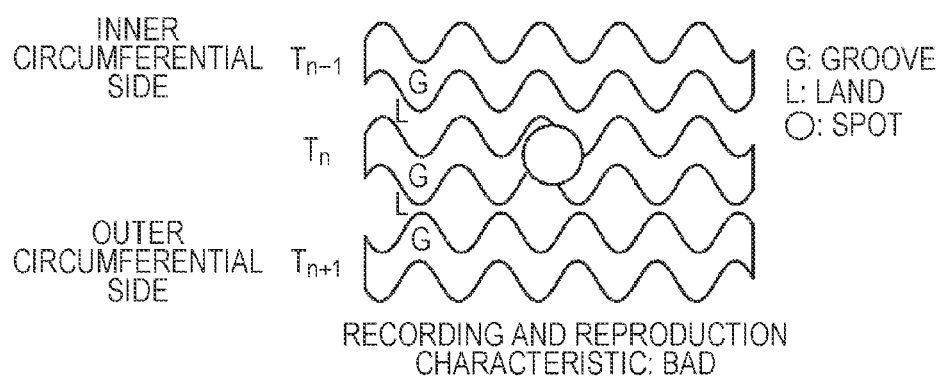
FIG. 4C is a schematic view showing a region where the adjacent wobble of the outer circumferential side has a different phase whereas the adjacent wobble of the inner circumferential side has the same phases.

FIG. 4C is a schematic view showing a region where the adjacent wobble of the outer circumferential side has a different phase whereas the adjacent wobble of the inner circumferential side has the same phase. For example, as shown in FIG. 4C, the adjacent wobble of the outer circumferential side is in the state of having the different phase in the angle region shown in an angle region number "5" of a track (TRK) number "2", whereas the adjacent wobble of the inner circumferential side has the same phase.

The total number of wobbles in one track increases by one wobble, for example, at a rate of once every one or two tracks, from the center toward the outer circumferential direction. Taking a parameter of BDXL as an example, the length of one track is increased by approximately 0.5 wobble for each time of going to one track outer circumference in the optical disc 10 in which cutting is accurately performed as standard. For this reason, basically, the wobble may be increased at a rate of one wobble to two tracks. In order to correct the errors stacked, there is also a place to increase one wobble to one track from time to time. An increased amount of the wobble is, for example, assigned to the angle region in order.

It is preferable that the wobble increase be performed at a portion of the range of one track, preferably at the range smaller than one RUB (that is, error correction block) per one track, and more preferably, only at the one angle region per one track. Accordingly, it is possible to limit the phase mismatch range of the continuous adjacent wobbles to a portion of the range of one track, preferably to the range smaller than one RUB, and more preferably, to one angle region. In FIG. 3, an example that the phase mismatch range of the adjacent wobble is limited to approximately ¼ of one RUB, which is the unit of the error correction block, is shown. In addition, wobble length change in the angle region increased by one wobble is 0.03% or less, and it is possible to sufficiently satisfy wobble length error standard in the existing BD format.

With regard to the order of the angle regions in which the number of wobbles increases, it is preferable to make a device for avoiding an occurrence of a different phase portion in the inner circumference and the outer circumference of the specific RUB at the same time. Approximately 2.7 RUB or more is present per one track even in the innermost circumference in the example of the BD. For this reason, it is possible to avoid the occurrence of the different phase portion of the inner circumference and the outer circumference of the specific RUB at the same time by separating the region where the number of wobbles increases more than a distance corresponding to the length of one RUB. For example, in a case where the radius partition a of the optical disc 10 is divided into ten portions, setting the order of the angle regions in which the different phase portion occurs can be considered as follows.

1→5→9→2→7→3→8→4→10→6→1 . . . (repeated below).

It is possible to guarantee that the different phase portion is away 4/10 or more of one circumference by setting this order.

Accordingly, it is preferable that the phase mismatch ranges circumferentially adjacent be provided to be separated at least as far away as the distance corresponding to one RUB (that is, error correction block). Specifically, it is preferable to provide to be separated at least as far away as the distance corresponding to one RUB (that is, error correction block) from a tip end of one phase mismatch range circumferentially adjacent to the tip end of the other phase mismatch range, or from an end of one phase mismatch range circumferentially adjacent to the end of the other phase mismatch range. As a result, it is possible to avoid a presence of two phase mismatch ranges within the specific RUB.

In the present specification, the type of setting the angle region radially divided from the center of the optical disc 10 and limiting the phase mismatch range of the adjacent wobble to the range of one angle region of one track is referred to as "disc angle region division type".

Boundary Portion between Radius Partitions

Figure 5:
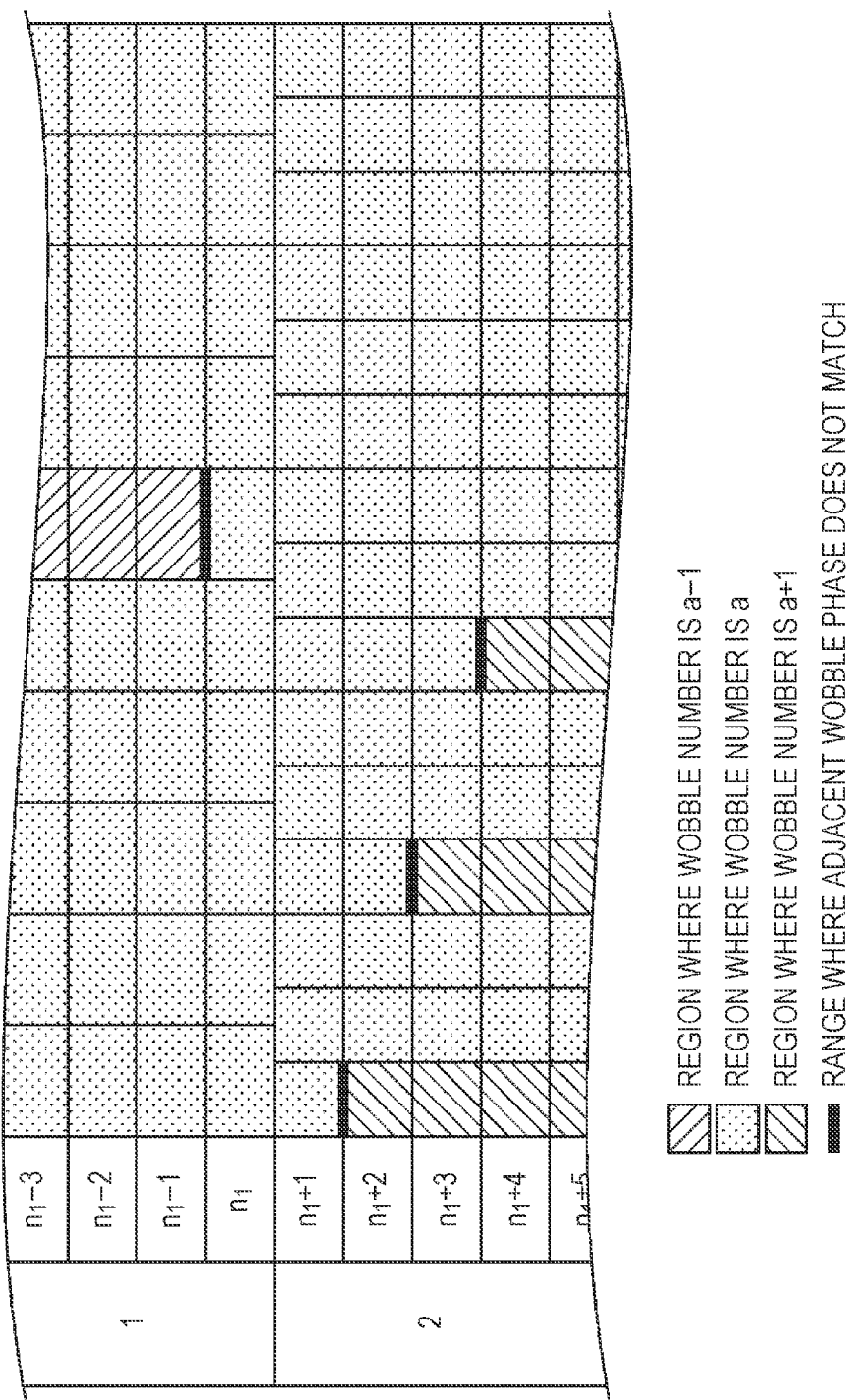
FIG. 5 is a diagram for describing a format of a boundary portion between radius partitions.

FIG. 5 is a diagram for describing a format of a boundary portion between radius partitions. A track length of the outer circumference is the length of approximately 2.4 times the inner circumference. It is possible to suppress variation of the wobble length change due to the wobble increase below a certain percentage by changing the angle division number of the recording region A of the optical disc 10 by radius. As shown in FIG. 5, it is preferable to perform the changing of the number of division at the track following the track in which the number of wobbles of the entire angle region is equal. That is, it is preferable that the boundary of the partition be provided between a track in which the number of wobbles of the entire divided region is equal and a track following this track. As a result, it is possible to avoid mixture of different angle regions and change the number of angle division.

FIG. 6 is a view showing an adjacent wobble phase change and an RF jitter change. In the embodiment, characteristic deterioration due to the adjacent wobble phase is limited to the region shorter than one RUB, which is the error correction block. For example, as shown in FIG. 3, in a case where one RUB is equally divided into four angle regions, the characteristic deterioration due to the adjacent wobble phase is limited to approximately ¼ of one RUB. Furthermore, the characteristic deterioration becomes approximately half by moving 360° phase at the different phase portion, compared to the RUB of adjacent wobble phase reverse phase conditions of the existing BD compliance disc. The characteristic deterioration of one RUB unit is suppressed to approximately ⅛ or less of the existing optical disc by these two effects. Moreover, of course, the characteristic deterioration due to the adjacent wobble phase asynchronous does not occur in the RUB in which all the adjacent wobble phases have the same phases.

1-4. Configuration of Disc

Figure 7A:
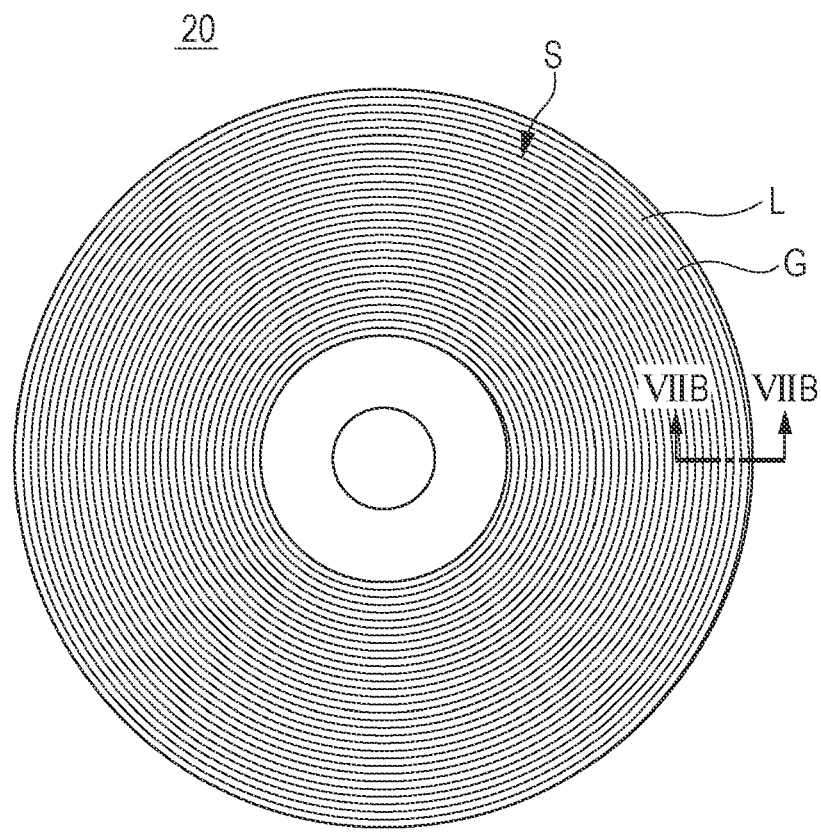
FIG. 7A is a plan view showing one example of an appearance of a disc according to a first embodiment of the present technology.

FIG. 7A is a plan view showing one example of an external appearance of a disc according to a first embodiment of the present technology. The disc 20 is, so-called is a master disc, and as shown in FIG. 7A, has a discoid shape, and one main surface thereof is the molding surface S. A molding surface S is the convex-concave surface configured of the groove G and the land L. The convex-concave surface has the same shape as the convex-concave surface of the above-described optical disc 10 or a shape in which a convex-concave relation of the convex-concave surface is inverted.

Here, a case where a disc 20 is a master disc is described as an example, but a replicated disc (stamper and the like), which is replicated from the master disc 20 may be used as the disc.

Figure 7B:
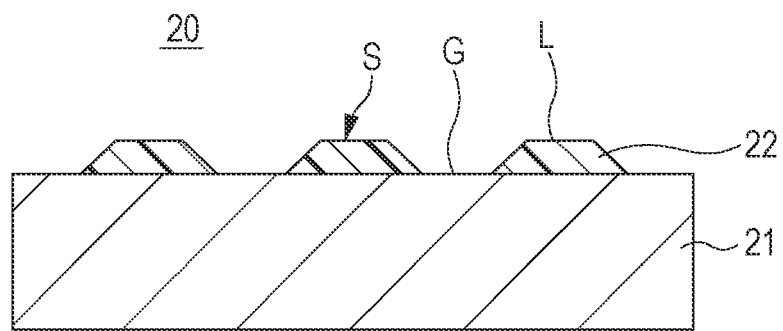
FIG. 7B is a cross-sectional view showing a portion of a cross section taken along a VIIB-VIIB line of FIG. 7A.

FIG. 7B is a view showing a portion of a cross section taken along a VIIB-VIIB line of FIG. 7A. The disc 20, as shown FIG. 7B, includes a substrate 21 and a shape layer 22 provided on the surface of the substrate 11. As the substrate 21, it is possible to use, for example, a silicon substrate or a glass substrate or the like. As the material of the shape layer 22, it is preferable to use an inorganic resist. As the inorganic resist, it is possible to use, for example, a metal oxide such as a transition metal. The groove G and the land L are configured from the shape layer 22.

1-5. Format of Disc

In a case where the molding surface S has the same shape as the convex-concave surface of the optical disc 10, the format of the disc 20 is the same as the optical disc 10 of the first embodiment. In contrast, in a case where the molding surface S has a shape in which the convex-concave relation of the convex-concave surface of the optical disc 10 is inverted, the format of the disc 20 is the format in which the relation of the groove G and the land L is inverted against the optical disc 10 of the first embodiment.

1-6. Effect

In the optical disc 10 according to the embodiment, it is possible to set the adjacent wobble phase to the same phase in most portions of the recording region A of the optical disc 10 by adoption of the disc angle region division type while complying with the existing format. Recording and reproduction characteristics or address reproduction characteristics are improved. It is possible to reduce the RF characteristics of one RUB unit or the deterioration of the address reproduction characteristics due to the adjacent wobble phase also in the boundary portion, in which the adjacent wobble phase does not have the same phase, compared to the existing optical disc.

It is possible to improve the recording characteristics, the reproduction characteristics, and the address reading characteristics at the same time in the optical disc 10 of CLV format in which the track wobble type is adopted by matching the wobble phases between the adjacent tracks in most regions or setting the wobble phases to the desired phases.

It is possible to typically limit the phase mismatch range of the adjacent wobble to the range smaller than one RUB by equally dividing one track in a central angle of the optical disc 10 and increasing the wobble for each angle region, and to improve the disc characteristics by having a small wobble length change sufficiently satisfying the permissible errors of the existing CLV format.

Also in a case where the wobble increases in the continuous tracks, the phase mismatch range of the adjacent wobble within one RUB is kept constant by selecting each angle region in order according to the specific rules.

It is possible to suppress a small linear velocity change due to the wobble increase in the entire optical disc within a certain range by changing the number of divisions of the angle region by the radius of the optical disc 10.

In Japanese Unexamined Patent Application Publication No. 2003-123265, a technology that divides the optical disc into zones in the radius direction and sets the wobble and the number of frames in the zones to integral numbers is suggested, but the technology has following disadvantages.

(1) The adjacent wobble phase is mismatched over the entirety of one track in a zone boundary, and the recording and the reproduction characteristics are deteriorated.

(2) When the zone is bridged over, since a block frequency is greatly changed, there is a concern of a writing error or a reproduction error.

(3) In order to respond to the disadvantages of the above-described (1) and (2), there is a case where it is necessary to take special measures such as not using one track of the zone boundary on a drive side.

(4) Since an adverse effect is particularly great when the zone boundary comes during the recording and reproduction of one frame, it is necessary to set the track in the zone to an integral multiple of the frame. In order to prevent a capacity decrease using this method, it is necessary to reduce the zone and reduce a difference in the number of wobbles in the track between the adjacent zones as much as possible. However, a condition that includes the integral multiple of the frame becomes the boundary reducing the zone.

It is possible to respectively solve the above-described disadvantages (1) to (4) of the zone division type as follows in the optical disc 10 according to the embodiment.

(1) The adjacent wobble mismatch portion is a portion of one RUB, and the deterioration of the recording and reproduction is greatly improved.

(2) A clear zone is not present in the optical disc 10 according to the embodiment and a change of the large block frequency does not occur. The change of the portion in which the wobble is increased in the angle region is 0.03% or less and does not affect the recording and reproduction.

(3) It is possible to obtain the effect of performance improvement without performing any changes for responding to the optical disc 10 according to the embodiment to a drive side.

(4) It is possible to increase the wobble at the continuous tracks and the disadvantage corresponding to the above-described disadvantage (4) does not occur in the optical disc 10 according to the embodiment since the clear zone is not present. It is not necessary to set the frame or the RUB per one track to the integral number in the optical disc 10 according to the embodiment.

2. Second Embodiment

2-1. Overview

Considering the impact on the address reproduction characteristics or the RF characteristics, it is desirable that the adjacent wobble phase have the same phase. If setting the adjacent wobble to the same phase, since a wobble beat signal having the same frequency as the wobble signal disappears, even if wobble amplitude applied to the track is completely identical, the wobble frequency signal amplitude obtained during the reproduction is decreased. Since only the signal necessary to the address reproduction remains, this is a preferable change for the address reproduction performance. However, for example, C/N (Carrier to Noise Ratio) of the wobble signal is defined in the BD format based on the condition that the adjacent wobble has a different phase. For this reason, when the above-described disc angle region division type is used in the existing BD format, there may be a case where a certain level of the wobble beat components are desired to remain in a form of low impact to the recording and the reproduction in order to satisfy the wobble signal standard.

Therefore, in the second embodiment, description will be given with regard to a technology in which a 90° phase type is combined with the disc angle region division type. Moreover, in the present specification, a type in which the wobble phases of the adjacent tracks are both set to +90° or both set to −90° in most regions is referred to as the "90° phase type". It is possible to generate a groove interval change comparable to that of the existing BD compliance optical disc by adopting the type, without causing a great deterioration to the RF signal characteristics.

2-2. Format of Optical Disc

90° Phase Type First, description will be given with regard to the format of the optical disc to which only the 90° phase type is applied.

Figure 8A:
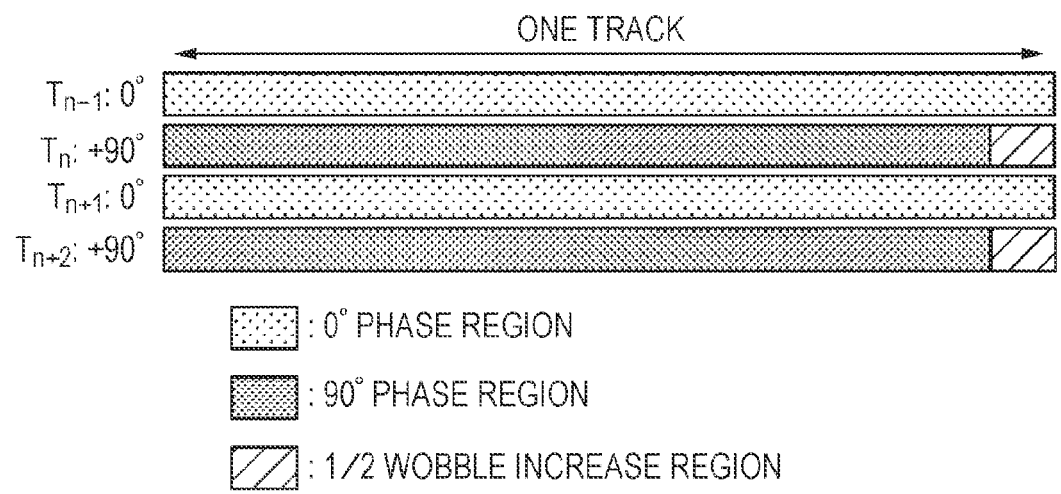
FIG. 8A is a diagram for describing a format of an optical disc to which only a 90° phase type is applied.
Figure 8B:
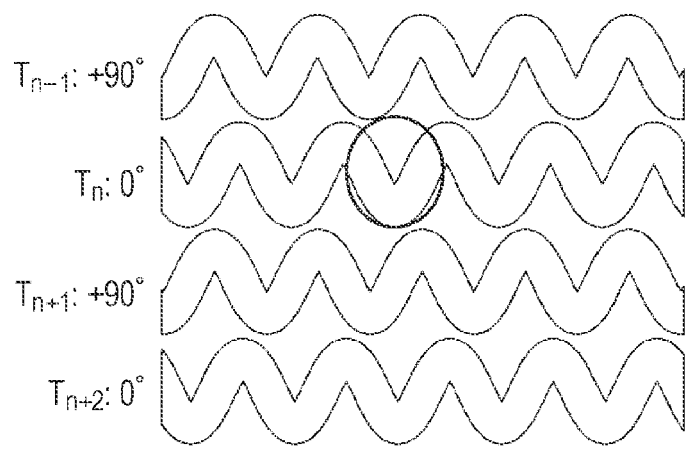
FIG. 8B is a view showing the wobble phase change between the adjacent wobbles in detail.

FIG. 8A is a diagram for describing a format of an optical disc to which only the 90° phase type is applied. FIG. 8B is a view showing the wobble phase change between the adjacent tracks in detail. The optical disc 10 to which only the 90° phase type is applied has, as shown in FIG. 8A, a plurality of 0° phase regions, a plurality of 90° phase regions, and a plurality of ½ wobble increase regions.

The 0° phase region is a region where the phase of the wobble of the track is 0°. The 90° phase region is a region where the phase of the wobble of the track is +90° or −90° based on the wobble of the 0° phase region. The ½ wobble increase region is a region where the number of wobbles in one track is increased by ½ wobble.

The 0° phase region has a length corresponding to one track. The ½ wobble increase region is continuously provided at one end of the 90° phase region, and a region where the 90° phase region and the ½ wobble increase region are added has the length corresponding to one track. The 0° phase region and the 90° phase region are alternately provided toward the outer circumference from the center of the optical disc 10 in a track unit. For this reason, the phase difference in both adjacent wobbles of the inner circumferential side and the outer circumferential side becomes +90° or −90° in most regions of the recording region A of the optical disc 10. It is preferable that the ½ wobble increase region is provided so as to overlap toward the outer circumferential direction (that is, radius direction) from the center of the optical disc 10.

In the 90° phase type, (1) a method of setting the number of wobbles per one track to the wobble integral multiple +¼, and (2) a method of providing the ½ wobble increase region to which ½ wobble is added once every two tracks are used in combination. As shown in FIG. 8B, it is possible to set the phase difference between both adjacent wobbles of the inner circumferential side and the outer circumferential side to +90° or −90° in most of recording region A by using these two methods in combination.

Figure 9A:
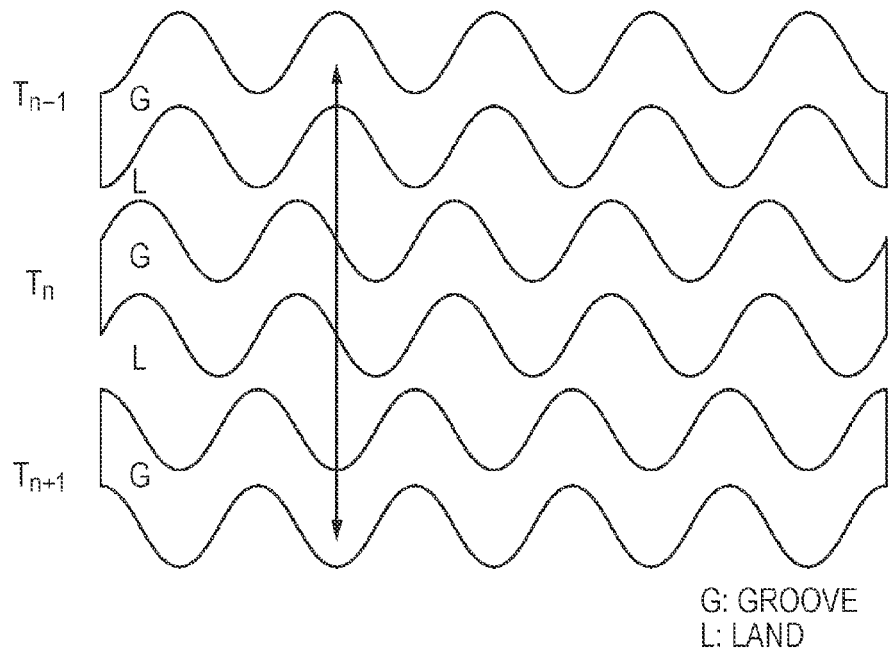
FIGS. 9A and 9B are schematic views for describing a method of setting a phase difference between both adjacent wobbles of the inner circumferential side and the outer circumferential side to 90°.
Figure 9B:
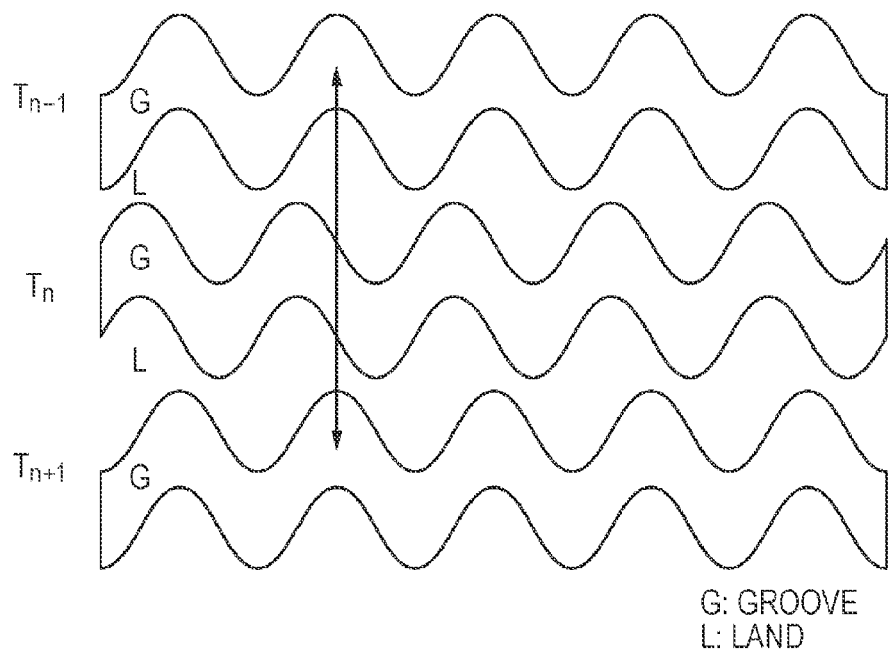

(1) In a case where the method of setting the number of wobbles per one track to the wobble integral multiple +¼ is used alone, as shown in FIG. 9A, the phases of the adjacent wobbles of the inner circumferential side and the outer circumferential side are inverted, and the reproduction characteristics are in the worst condition. On the other hand, in a case where (1) the method of setting the number of wobbles per one track to the wobble integral multiple +¼ and (2) the method of providing the ½ wobble increase region to which ½ wobble is added once every two tracks are used in combination, as shown in FIG. 9B, the phases of the adjacent wobbles of the inner circumferential side and the outer circumferential side match with each other, and the reproduction characteristics are in a good condition.

Figure 10:
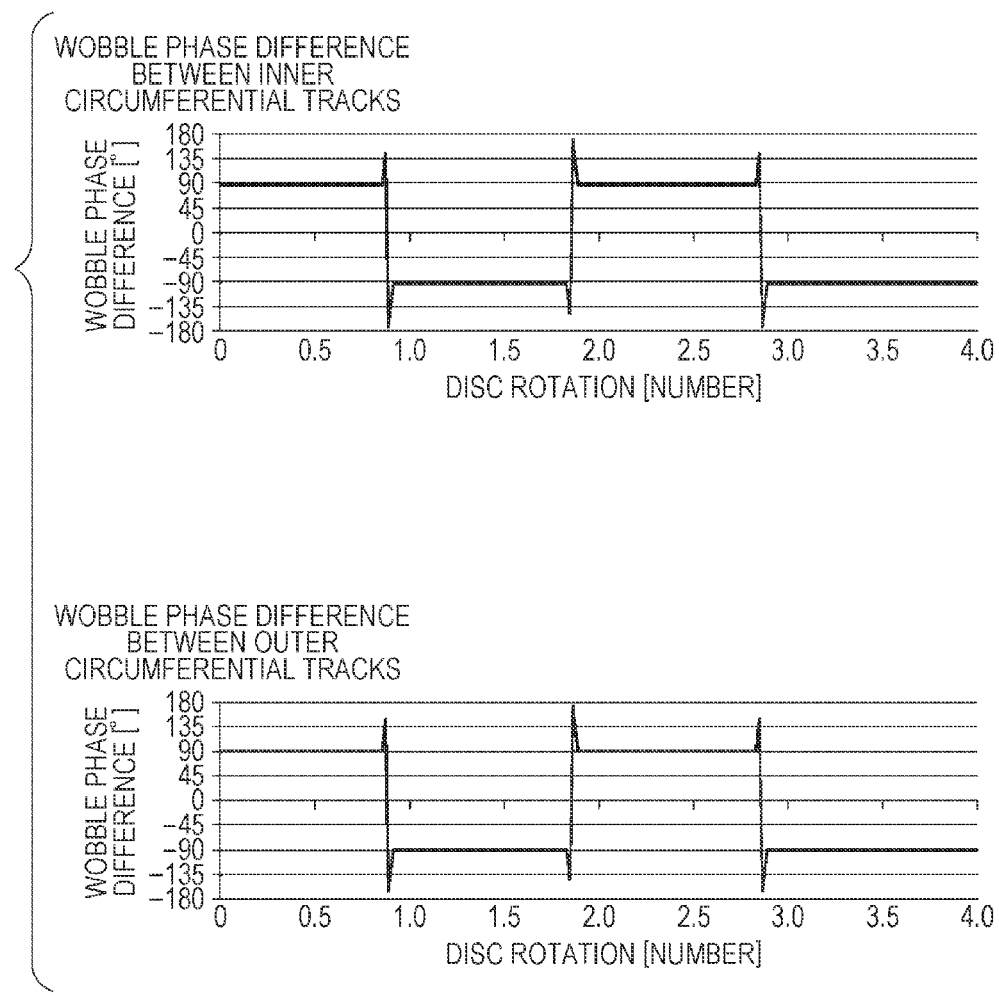
FIG. 10 is a view showing the adjacent wobble phase change.

FIG. 10 is a view for describing the wobble phase change between the adjacent tracks. From FIG. 10, it is possible to know that the adjacent track repeats +90° and −90° except for the ½ wobble increase portion. In a case of this type, since the phase difference between the inner circumference and the outer circumference also including the ½ wobble increase portion is equal, leakage of the wobble frequency does not occur in the RF reproduction signal.

Combination with Disc Angle Region Division type and 90° Phase type

Next, description will be given with regard to a format of the optical disc to which the disc angle region division type and the 90° phase type are applied in combination.

FIG. 11 is a diagram for describing the format of the optical disc to which a disc angle division type and the 90° phase type applied in combination. The ½ wobble increase region is provided at a rate of once every two tracks. It is preferable that the ½ wobble increase region be provided at the same position of the same angle region. Therefore, it is possible to provide the ½ wobble increase region so as to overlap toward the outer circumferential direction (that is, radius direction) from the center of the optical disc 10. Accordingly, it is possible to suppress adverse effects on the RF signal in the partition in which the ½ wobble increase region is provided by setting the adjacent wobbles of the inner circumferential side and the outer circumferential side to the same phases.

The ½ wobble increase region, for example, has a size smaller than one RUB, which is the error correction block, preferably, a size shorter than the angle region, and more preferably, a size of less than or equal to half of the angle region. Therefore, it is possible to reduce the impact caused by providing the ½ wobble increase reason.

As shown in FIG. 11, a first phase mismatch range, a second phase mismatch range, a third phase mismatch range, and a constant phase difference range are between the adjacent wobbles. The first phase mismatch range is a range where the adjacent wobble phase is mismatched due to the wobble increase with respect to the standard number of wobbles. The first phase mismatch range corresponds to the phase mismatch range in the above-described first embodiment. The standard number of wobbles, for example, is the minimum number of wobbles included in the divided region of the innermost circumferential track of a recording region (data recording region) A or the minimum number of wobbles included in the divided region of the innermost circumferential track of each radius partition a. The second phase mismatch range is a range where the adjacent wobble phase is mismatched by increasing by 0.5 wobbles at a rate of once every two tracks. The third phase mismatch range is a range where the first phase mismatch range and the second phase mismatch range overlap each other. The constant phase difference range is a range where the phase difference of the adjacent wobble is a constant value of 90° or −90°. Here, the phase mismatch range of the adjacent wobble means a range where the phase difference between the adjacent wobbles is changed toward the circumferential direction, and the range in which the phase difference between the adjacent wobbles is the constant value (90° or −90°) toward the circumferential direction is defined as being excluded from the phase mismatch range of the adjacent wobble.

Moreover, the 90° phase type may be applied to the optical disc alone without being combined with the disc angle region division type.

2-3. Effect

It is possible to easily satisfy the wobble signal C/N standard of the existing optical disc format, which is standardized on the condition that the phase of the adjacent wobble does not has the same phase, that is, the existing optical disc format standardized by including wobble beat components, by setting the wobble phase difference between the adjacent tracks to +90° or −90° in most regions.

Introduction of the present technology into the existing CLV format becomes easier by combining the 90° phase type with the disc angle region division type, if necessary.

It is possible to easily satisfy the existing wobble signal C/N standard on the condition of a certain level of the beat components, while the deterioration of the RF signal is suppressed by combining the disc angle region division type with the 90° phase type when the disc angle region division type corresponds to the existing disc format.

Figure 13A:
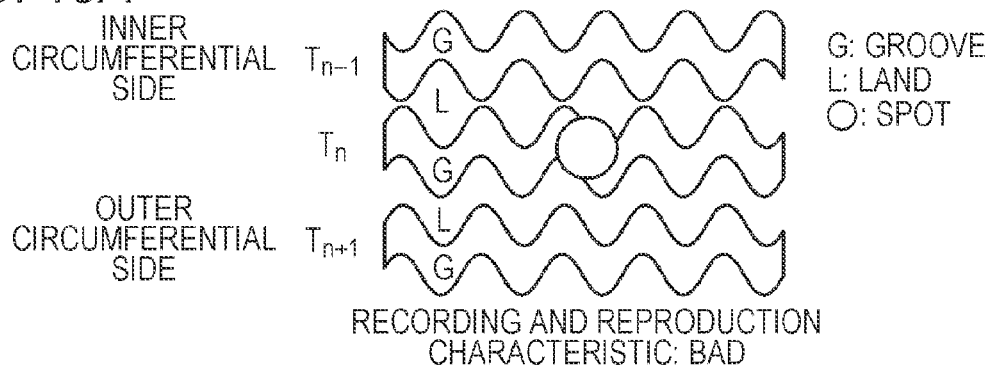
FIGS. 13A to 13D are schematic views showing four patterns extracted from the periodical adjacent wobble phase change.
Figure 13B:
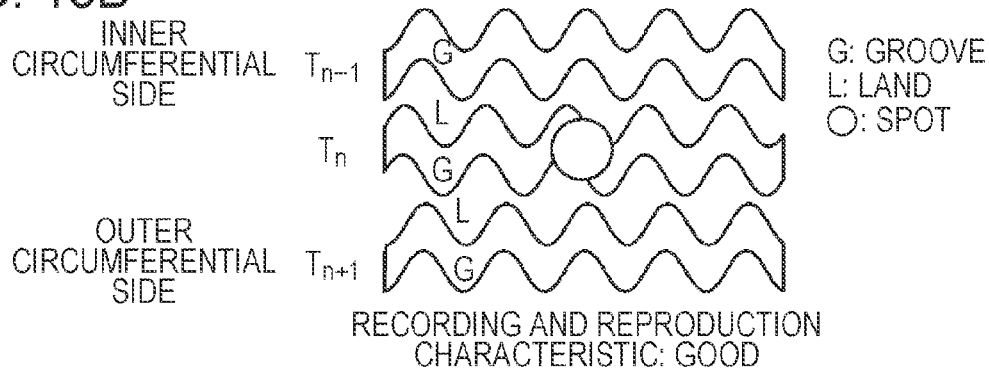
Figure 13C:
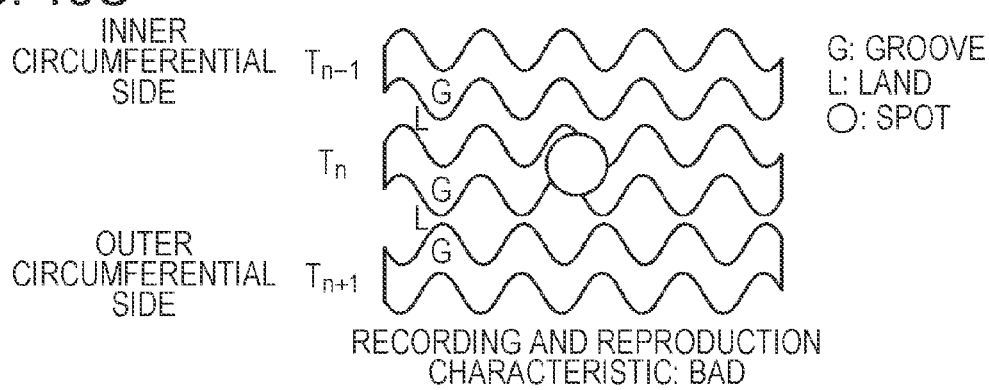
Figure 13D:
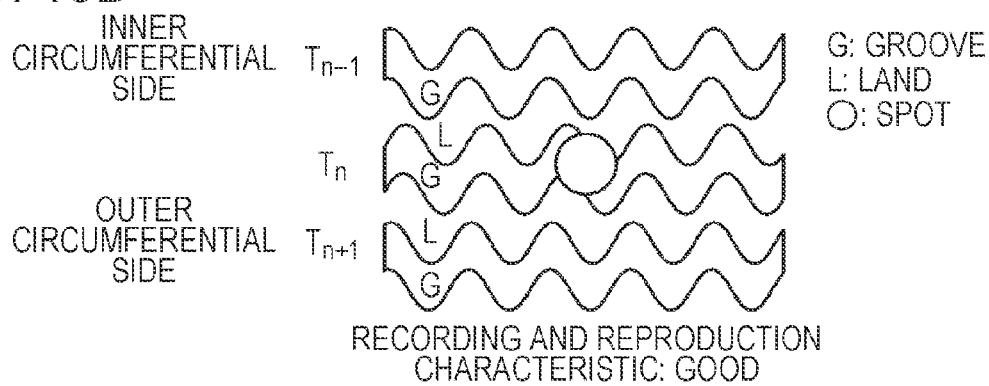
Figure 15:
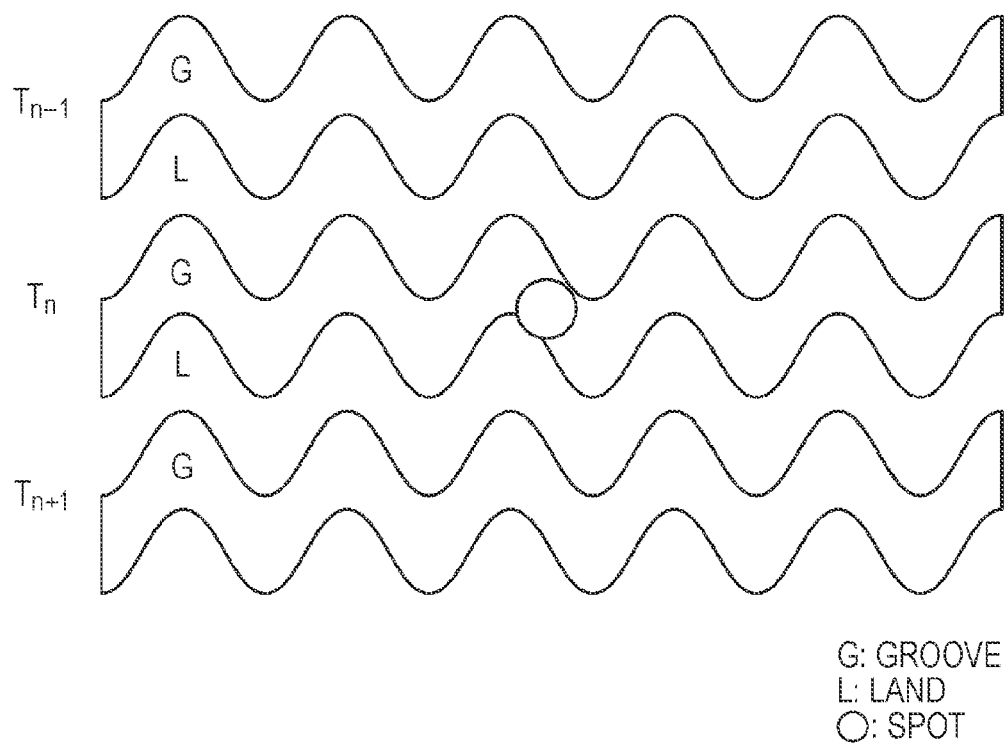
FIG. 15 is a schematic view showing a state where both of the adjacent wobbles of the inner circumferential side and the outer circumferential side have the same phases.

Since the phase difference between the adjacent wobbles on both sides are +90° or −90° except for the portion of the range of one track, the phase of the adjacent wobble is in a state as shown in FIG. 9A, FIG. 13A, and FIG. 13C, and it is possible to avoid the characteristics of the optical disc 10 being significantly deteriorated. Accordingly, it is possible to suppress the decrease in the characteristics of the optical disc 10 due to the phase mismatch of the adjacent wobble.

3. Modification Example

Hereinafter, description is given with regard to the embodiments of the present technology in detail; however, the present technology is not limited to the above-described embodiments and various modifications can be made based on the technical concept of the present technology.

For example, the configuration, the method, the process, the shape, the material, the numerical value and the like taken as an example in the above-described embodiments are merely examples, and if necessary, the configuration, the method, the process, the shape, the material, the numerical value and the like which are different from these may be used.

The configuration, the method, the process, the shape, the material, the numerical value and the like of the above-described embodiments may be combined with each other without departing from the concept of the present technology.

It is possible to change the number of divisions of the angle region of the disc angle region division type according to the optical disc standard to be compatible. In addition, the number of wobbles increasing in each angle region may be more than one wobble.

The present technology is easily applicable to the existing CLV format, but is also applicable to a new high-density optical disc. In a case where the present technology is applied to the new high-density optical disc, it is also naturally possible to newly standardize the format of the high-density optical disc on the condition of the present technology.

In the above-described embodiment, description is given with regard to the example in which the present technology is applied to the optical disc having an information signal layer of a single layer, but the present technology may be applicable to the optical disc having the information signal layer of two or more layers. In this case, it is possible to apply the present technology to the wobble track provided in an intermediate layer as well.

In the above-described embodiments, a case where the present technology is applied to the optical disc which has a configuration in which the information signal layer and the light transmission layer are stacked on the substrate in this order, and in which the recording or the reproduction of the information signal is performed by irradiating the information signal layer with the laser beam from the light transmission layer side is described as an example, but the present technology is not limited to the example. For example, the present technology is applicable to the optical disc which has a configuration in which the information signal layer and a protection layer are stacked on the substrate in this order, and in which the recording or the reproduction of the information signal is performed by irradiating the information signal layer with the laser beam from the substrate side, or is also applicable to the optical disc which has a configuration in which the information signal layer is provided between the two sheets of substrates, and in which the recording or the reproduction of the information signal is performed by irradiating the information signal with the laser beam layer from a side of one substrate.

In the above-described embodiment, description is given with regard to the disc having the configuration in which the shape layer is provided on the surface of the substrate, but the configuration of the disc is not limited thereto. For example, the configuration in which the convex-concave shape is directly provided on the substrate surface may be adopted.

In addition, the following configurations can be adopted to the present technology.

(1) An information recording medium including a plurality of wobbled tracks, in which a phase mismatch range of an adjacent wobble is a portion of a range of one track.

(2) The information recording medium according to (1), in which the phase mismatch range is smaller than an error correction block.

(3) The information recording medium according to (1) or (2), in which the phase mismatch ranges that are circumferentially adjacent are provided to be separated at least as far away as the distance corresponding to the error correction block.

(4) The information recording medium according to any one of (1) to (3), in which a plurality of divided regions that are radially divided are set, and the phase mismatch range is provided in units of the divided regions.

(5) The information recording medium according to (4), in which a total number of wobbles within one track increases toward an outer circumferential direction from the center, and an increased amount of the wobbles is assigned to the plurality of divided regions in order.

(6) The information recording medium according to (4) or (5), in which a plurality of partitions are provided in a radius direction, and the number of the division is different for each partition of the plurality of partitions.

(7) The information recording medium according to (6), in which a boundary of the partition is provided between a track in which the number of wobbles of the entire divided region is equal and a following track of the track.

(8) The information recording medium according to any one of (1) to (7), in which a phase matching range of an adjacent wobble is included in addition to the phase mismatch range, and the phase matching range is a remaining range of one track.

(9) The information recording medium according to any one of (1) to (8), in which a phase difference between the adjacent wobbles changes in the phase mismatch range.

(10) The information recording medium according to any one of (1) to (9), in which a range where the phase difference of the adjacent wobbles on both sides is a constant value of +90° or −90° is included.

(11) The information recording medium according to any one of (1) to (10), in which a plurality of wobble increase regions in which the number of wobbles in one track which increases ½ wobble are included, and the wobble increase regions are provided to overlap in a radius direction while being provided at a rate of once every two tracks.

(12) A disc including a plurality of wobbled tracks, in which a phase mismatch range of an adjacent wobble is a portion of a range of one track.

(13) An information recording medium including a plurality of wobbled tracks, in which a phase difference between adjacent wobbles on both sides is +90° or −90° except for a portion of a range of one track.

(14) A disc including a plurality of wobbled tracks, in which a phase difference between adjacent wobbles on both sides is +90° or −90° except for a portion of a range of one track.

It should be understood by those skilled in the art that various modifications, combinations, sub-combinations and alterations may occur depending on design requirements and other factors insofar as they are within the scope of the appended claims or the equivalents thereof.

What is claimed is:

1. An information recording medium comprising:
   a plurality of wobbled tracks,
   wherein:
   a phase mismatch range of an adjacent wobble is a portion of a range of one track;
   a plurality of divided regions that are radially divided are set,
   the phase mismatch range is provided in units of the divided regions;
   a total number of wobbles within one track increases toward an outer circumferential direction from the center, and
   an increased amount of the wobbles is assigned to the plurality of divided regions in order.

2. The information recording medium according to claim 1,
   wherein the phase mismatch range is smaller than an error correction block.

3. The information recording medium according to claim 1,
wherein the phase mismatch ranges that are circumferentially adjacent are provided to be separated at least as far away as the distance corresponding to the error correction block.

4. An information recording medium:
a plurality of wobbled tracks,
wherein:
   a phase mismatch range of an adjacent wobble is a portion of a range of one track;
   a plurality of divided regions that are radially divided are set,
   the phase mismatch range is provided in units of the divided regions;
   a plurality of partitions are provided in a radius direction, and
   the number of divisions is different for each partition of the plurality of partitions.

5. The information recording medium according to claim 4,
wherein a boundary of the partition is provided between a track in which the number of wobbles of the entire divided region is equal and a track following the track.

6. The information recording medium according to claim 1,
wherein a phase matching range of an adjacent wobble is included in addition to the phase mismatch range, and
the phase matching range is a remaining range of one track.

7. The information recording medium according to claim 1,
wherein a phase difference between the adjacent wobbles changes in the phase mismatch range.

8. The information recording medium according to claim 1,
wherein a range where the phase difference of the adjacent wobbles on both sides is a constant value of +90° or −90° is included.

9. The information recording medium according to claim 8,
wherein a plurality of wobble increase regions in which the number of wobbles in one track which increases ½ wobbles are included, and
the wobble increase regions are provided to overlap in a radius direction while being provided at a rate of once every two tracks.

10. An information recording medium comprising:
a plurality of wobbled tracks,
   wherein a phase difference between adjacent wobbles on both sides is +90° or −90° except for a portion of a range of one track:,
   a plurality of wobble increase regions in which the number of wobbles in one track which increases ½ wobbles are included, and
   the wobble increase regions are provided to overlap in a radius direction while being provided at a rate of once every two tracks.

11. A disc comprising:
a plurality of wobbled tracks,
wherein a phase difference between adjacent wobbles on both sides is +90° or −90° except for a portion of a range of one track
a plurality of wobble increase regions in which the number of wobbles in one track which increases ½ wobbles are included, and
the wobble increase regions are provided to overlap in a radius direction while being provided at a rate of once every two tracks.

* * * * *